US012717618B2

(12) United States Patent
Fenger et al.

(10) Patent No.: US 12,717,618 B2
(45) Date of Patent: Aug. 25, 2026

(54) DYNAMICALLY ADJUSTING THREAD AFFINITIZATION USING HARDWARE-BASED CORE AVAILABILITY NOTIFICATIONS

(71) Applicant: Intel Corporation, Santa Clara, CA (US)

(72) Inventors: Russell J. Fenger, Beaverton, OR (US); Rajshree A. Chabukswar, Sunnyvale, CA (US); Benjamin Graniello, Gilbert, AZ (US); Monica Gupta, Hilsboro, OR (US); Guy M. Therien, Sherwood, OR (US); Michael W. Chynoweth, Placitas, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/954,411

(22) Filed: Sep. 28, 2022

(65) Prior Publication Data

US 2024/0103914 A1 Mar. 28, 2024

(51) Int. Cl.
*G06F 9/48* (2006.01)
*G06F 1/3228* (2019.01)

(52) U.S. Cl.
CPC .......... *G06F 9/4887* (2013.01); *G06F 1/3228* (2013.01)

(58) Field of Classification Search
CPC ....... G06F 1/3228; G06F 1/206; G06F 9/5094
See application file for complete search history.

(56) References Cited

U.S. PATENT DOCUMENTS

| | | | |
|---|---|---|---|
| 5,629,594 A | 5/1997 | Jacobus et al. | |
| 6,047,308 A | 4/2000 | Grummer et al. | |
| 7,903,579 B2 | 3/2011 | Hughes et al. | |
| 8,484,857 B2 | 7/2013 | Demianovich et al. | |
| 9,798,629 B1 | 10/2017 | Shilane et al. | |
| 10,310,588 B2 * | 6/2019 | Varma | G06F 1/266 |
| 10,345,890 B2 | 7/2019 | Wei et al. | |
| 10,802,877 B2 | 10/2020 | Lin et al. | |
| 2015/0346809 A1 * | 12/2015 | Kumar | G06F 9/4893 713/323 |
| 2017/0024243 A1 | 1/2017 | Kishan et al. | |
| 2017/0371399 A1 * | 12/2017 | Weissmann | G06F 1/266 |

(Continued)

OTHER PUBLICATIONS

Andrea Fortuna, "Forensic Artifacts: evidences of program execution on Windows systems," May 23, 2018, 5 pages total.

(Continued)

*Primary Examiner* — Edward J Dudek, Jr.
(74) *Attorney, Agent, or Firm* — NICHOLSON DE VOS WEBSTER & ELLIOTT LLP

(57) ABSTRACT

In one embodiment, a processor includes: a plurality of cores to execute instructions; at least one monitor coupled to the plurality of cores to measure at least one of power information, temperature information, or scalability information; and a control circuit coupled to the at least one monitor. Based at least in part on the at least one of the power information, the temperature information, or the scalability information, the control circuit is to notify an operating system that one or more of the plurality of cores are to transition to a forced idle state in which non-affinitized workloads are prevented from being scheduled. Other embodiments are described and claimed.

20 Claims, 14 Drawing Sheets

(56) References Cited

U.S. PATENT DOCUMENTS

| | | | | |
|---|---|---|---|---|
| 2018/0088985 | A1* | 3/2018 | Blaine | G06F 9/4881 |
| 2018/0095517 | A1* | 4/2018 | Sagar | G06F 9/485 |
| 2021/0011630 | A1 | 1/2021 | Zhu et al. | |

OTHER PUBLICATIONS

Intel Corporation, "Intel® Dynamic Platform and Thermal Framework (DPTF) for Chromium OS," Feb. 18, 2020, 3 pages total.
Intel Corporation, "12th Gen Intel® Core™: performance hybrid architecture," date unknown, 1 page.
Intel Corporation, "Intel® Fact Sheet: Intel Unveils Biggest Architectural Shifts in a Generation for CPUs, GPUs and IPUs ," 2021, 10 pages total.
Intel Corporation, "Intel Architecture Day 2021 Presentation," 2021, 195 pages total.

* cited by examiner 600
612
614
616
Core
EE
Perf
Pcore0 !0 !0
Pcore1 !0 !0
Pcore2 !0 !0
Pcore3 !0 !0
Ecore0 !0 !0
Ecore1 !0 !0
Ecore2 !0 !0
Ecore3 !0 !0
610
630
Power / Thermal Event Detect
Core
EE
Perf
Pcore0 !0 !0
Pcore1 !0 !0
Pcore2 0 0
Pcore3 0 0
Ecore0 !0 !0
Ecore1 !0 !0
Ecore2 !0 !0
Ecore3 !0 !0
OS Update
650
Core Status Structure
Pcore2
Pcore3
Pcore0
Pcore1
Ecore2
Ecore3
Ecore0
Ecore1
Software View of Available Cores
State Change Interrupt
Force Idle
Available
t=0
t=n
Time

DYNAMICALLY ADJUSTING THREAD AFFINITIZATION USING HARDWARE-BASED CORE AVAILABILITY NOTIFICATIONS

BACKGROUND

Multi-processor computer systems may contain a central processing unit (CPU) that has more processor cores than what can function correctly during certain operating conditions, such as insufficient power or unacceptable thermal conditions. Oftentimes, a power controller will reduce capabilities during these conditions, e.g., by lowering frequency and/or voltage. In some cases, the power controller also may cause certain cores to enter into an inactive state in which the cores are disabled. While these techniques can bring about resolution of the condition, they impact performance, particularly in situations where a given workload is affinitized to a core placed into the inactive state.

DETAILED DESCRIPTION

Figure 1:
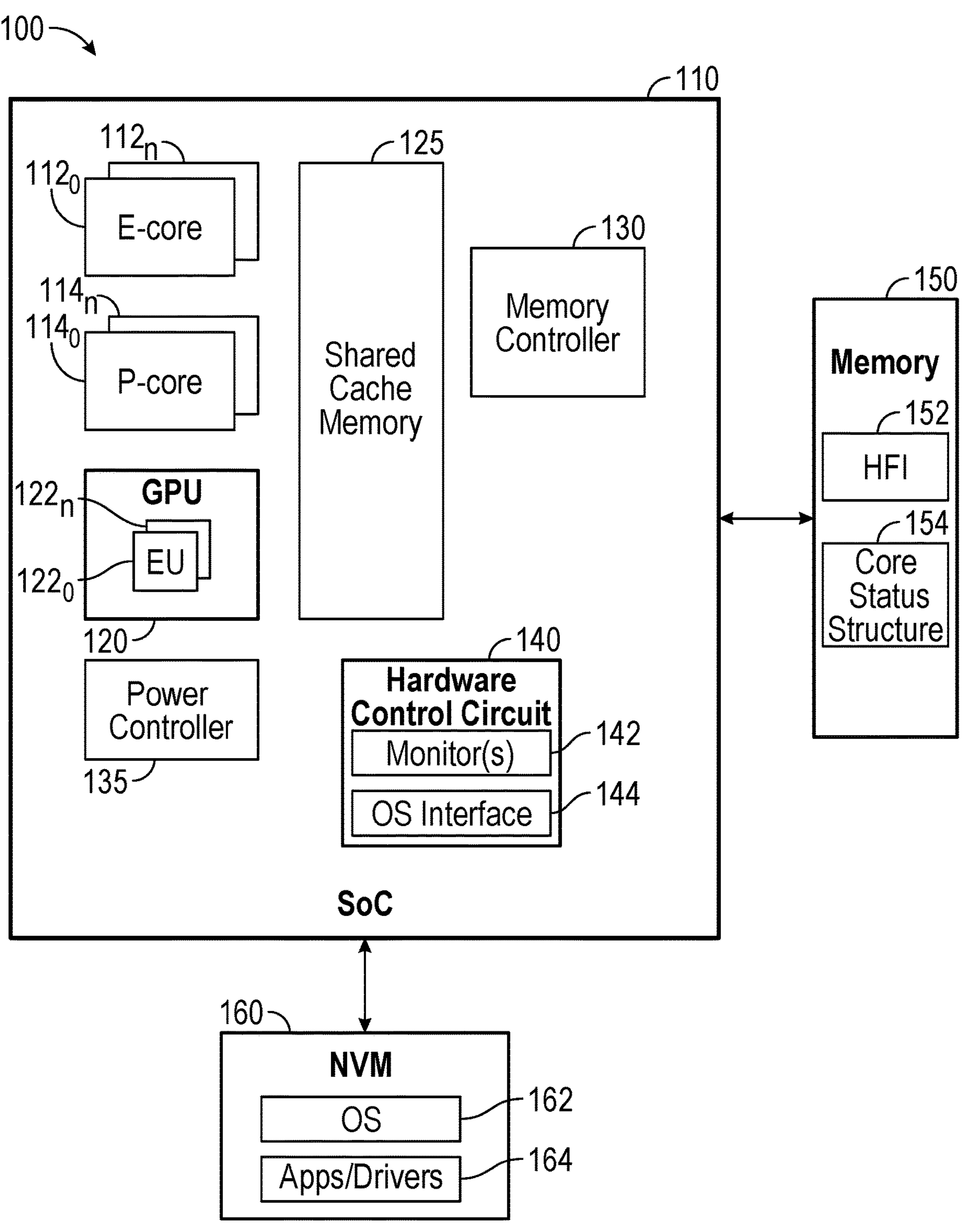
FIG. 1 is a block diagram of a computing system in accordance with an embodiment.

In various embodiments, a processor is configured with hardware circuitry to identify a processor constraint (e.g., power, thermal or scalability) and notify an operating system (OS) that one or more specific cores are to be forced to an idle state. In turn, the OS may use in this information in making scheduling decisions, and further to notify software applications and/or drivers of this forced idle condition. Without this notification, software components may assume that all cores are available. Thus without this notification, deleterious effects may inhere, including: 1) performance degradation by running more software threads than desired due to assuming all logical processors are available; and/or 2) incorrectly affinitizing software thread(s) to logical processors or cores that are no longer available, resulting in unexpected behavior (e.g., accessing hardware counters on the wrong core). Although embodiments are not limited in this regard, an application may be the entity that affinitizes a software thread to a given core. Affinitization means that this thread is identified for execution on a particular core (e.g., having a logical processor identifier). In contrast, a non-affinitized thread is a software thread that is not identified to be executed on a particular core.

With one or more embodiments, the notification techniques described herein give software applications or libraries the option to optimize based on which cores are currently available. By notifying a threading library such as an Intel® Thread Building Block (TBB), OpenMP or Microsoft™ Concurrency library, applications that use these libraries may become more scalable. In one or more embodiments, the notification techniques and resulting optimization of a number of threads running can be deployed at scale through updates to such threading libraries.

Using the techniques described herein in which hardware adjusts specific core availability for core scaling stockkeeping unit (SKU) support, and concomitant notification to software applications/drivers, these software consumers can scale a number of threads accordingly. And OS scheduling techniques may controllably use cores in a forced idle state in a limited fashion after receiving a request from hardware. In contrast without an embodiment, just parking or otherwise idling a core via processor hardware does not inform software layers to scale a thread count accordingly. In this case software components that are not aware of which logical processors are available may function incorrectly or execute in a manner that results in performance loss. This is so, since without becoming aware at the software level regarding core parking does not provide performance benefits, as the number of software threads issued by software are still equal to total core count.

With embodiments, thread scaling and thread affinitization support may be enhanced by providing the notifications described herein to software applications, drivers, or other software components when temporal constraints result in changes on how many cores and which specific cores are available.

In response to such notifications, software components may: 1) dynamically adjust how many software threads are active (e.g., reducing core count to reduce unnecessary context switches) based on the number of cores available, resulting in improved performance for applications that do not scale; and 2) identify which cores are available for running affinitized thread activity (e.g., software tools reading core hardware counters) since software threads that are affinitized to cores that are no longer available will no longer run on the expected core.

Referring now to FIG. 1, shown is a block diagram of a system in accordance with an embodiment. As shown in FIG. 1, computing system 100 may be any type of computing device, ranging from a relatively small device such as a smartphone to larger devices, including laptop computers, desktop computers, server computers or so forth. In the high level shown in FIG. 1, an SoC 110 couples to a memory 150 which is a system memory (e.g., a dynamic random access memory (DRAM)), and a non-volatile memory 160 which in different embodiments can be implemented as a flash memory, disk drive or so forth. Understand that the terms "system on chip" or "SoC" are to be broadly construed to mean an integrated circuit having one or more semiconductor dies implemented in a package, whether a single die, a plurality of dies on a common substrate, or a plurality of dies at least some of which are in stacked relation. Thus as used herein, such SoCs are contemplated to include separate chiplets, dielets, and/or tiles, and the terms "system in package" and "SiP" are interchangeable with system on chip and SoC.

With respect to SoC 110, included are a plurality of cores. In the particular embodiment shown, two different core types are present, namely first cores 112*o*-112*n* (so-called efficiency cores (E-cores)) and second cores 1140-*n* (so-called performance cores (P-cores)). As further shown, SoC 110 includes a graphics processing unit (GPU) 120 including a plurality of execution units (EUs) 1220-*n*. In one or more embodiments, first cores 112 and second cores 114 may be implemented on separate dies.

These various computing elements couple to additional components of SoC 110, including a shared cache memory 125, which in an embodiment may be a last level cache (LLC) having a distributed architecture. In addition, a memory controller 130 is present along with a power controller 135, which may be implemented as a hardware control circuit that may be a dedicated microcontroller to execute instructions, e.g., stored on a non-transitory storage medium (e.g., firmware instructions). In other cases, power controller 135 may have different portions that are distributed across one or more of the available cores.

Still with reference to FIG. 1, SoC 110 further includes a hardware control circuit 140 independent of power controller 135. In various embodiments herein, hardware control circuit 140 may be configured to identify when a given constraint has been detected, e.g., using one or more monitors 142. When identified, hardware control circuit 140, via an OS interface 144, may notify an OS 162 with a request to place one or more particular cores into a forced idle state. In one instantiation, this communication of whether a specific logical processor should be used or not is communicated to the operating system via Intel® Thread Director technology.

While different manners of such communication are possible, in one embodiment hardware control circuit 140, via OS interface 144, may update information present in an interface structure stored in memory 150. Specifically, a hardware feedback interface (HFI) 152 may be stored in memory 150 that includes information regarding, inter alia, efficiency and performance levels of various cores. In embodiments herein, the hardware feedback information further may include an indication whether a core is in a forced idle state. When this information is updated, hardware control circuit 140 may communicate, e.g., via an interrupt to OS 162. As illustrated, NVM 160 may further store, in addition to OS 162, various applications, drivers and other software (generally identified at 164).

In addition to making scheduling decisions based at least in part on cores present in this forced idle state, OS 162 may further communicate such information to software 164. To this end, OS 162 may update information in a core status structure 154, also present in memory. When a given core is indicated to be transitioned into the forced idle state, an entry in core status structure 154 may be updated. In addition, OS 162 may provide an indication, e.g., via an interrupt to software 164, to denote the availability of an update to the information present in core status structure 154. In this way, such software may update a threading policy. Understand while shown at this high level in the embodiment of FIG. 1, many variations and alternatives are possible. For example other hardware-software interfaces may provide information regarding forced idle state operation. As one such example, a thread level model specific register (MSR) can be used to notify regarding a hardware decision to forced idle one or more cores (without presence or reference of HFI 152).

Also other implementations of SoC 100 can equally incorporate embodiments. For example depending on market segment, an SoC can include, instead of a hybrid product having heterogeneous core types, only cores of a single type. Further, more or different accelerator types may be present. For example, in addition to or instead of GPUs, an SoC may include a direct streaming accelerator (DSA), field programmable gate array (FPGA) or other accelerator.

Figure 2:
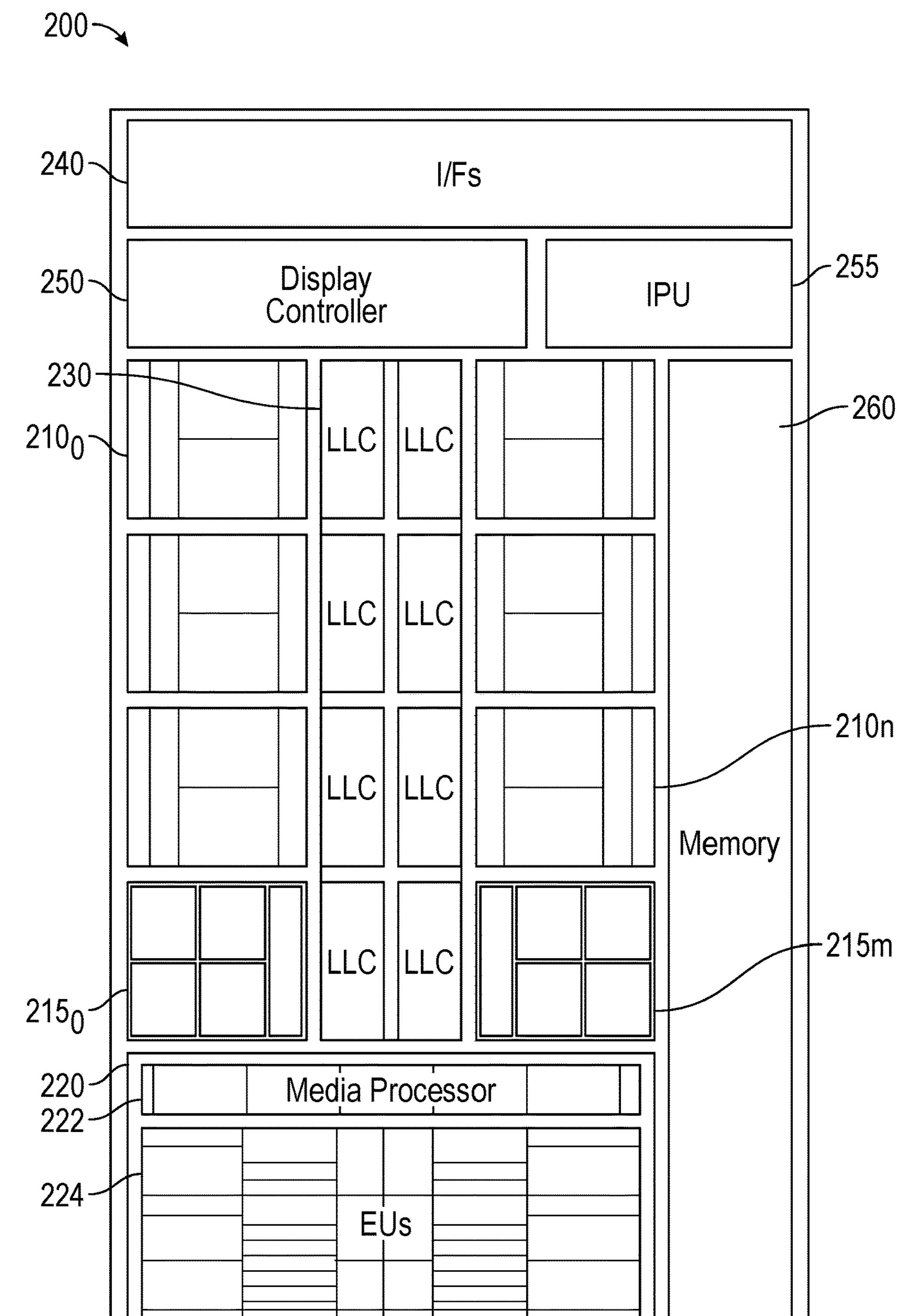
FIG. 2 is block diagram of a system on chip in accordance with an embodiment.

Referring now to FIG. 2, shown is a block diagram of an SoC in accordance with another embodiment. More specifically as shown in FIG. 2, SoC 200 is a multicore processor, including a first plurality of cores 210$_{0-n}$ and a second plurality of cores 215$_{0-m}$. In one or more embodiments, first cores 210 may be implemented as performance cores, in that they may include greater amounts of circuitry (and wider and deeper pipelines) to perform more advanced computations in a performant manner. In contrast, second cores 215 may be configured as smaller cores that consume less power and may perform computations in a more efficient manner (e.g., with respect to power) than first cores 210. In certain implementations, first cores 210 may be referred to as P-cores (for performance cores) and second cores 215 may be referred to as E-cores (for efficiency cores). Note that different numbers of first and second cores may be present in different implementations.

As further illustrated in FIG. 2, a cache memory 230 may be implemented as a shared cache arranged in a distributed manner. In one or more embodiments, cache memory 230 may be a LLC having a distributed implementation in which one or more banks are associated with each of the cores.

As further illustrated, a graphics processing unit (GPU) 220 may include a media processor 222 and a plurality of EUs 224. Graphics processor 220 may be configured for efficiently performing graphics or other operations that can be broken apart for execution on parallel processing units such as EUs 224.

Still referring to FIG. 2, various interface circuitry 240 is present to enable interface to other components of a system. Although embodiments are not limited in this regard, such interface circuitry may include a Peripheral Component Interconnect Express (PCIe) interface, one or more Thunderbolt™ interfaces, an Intel® Gaussian and Neural Accelerator (GNA) coprocessor and so forth. As further illustrated, processor 200 includes a display controller 250 and an image processing unit (IPU) 255.

As further shown, SoC 200 also includes a memory 260 that may provide memory controller functionality for interfacing with a system memory such as DRAM. Understand while shown at this high level in the embodiment of FIG. 2, many variations and alternatives are possible. Note that in this implementation, separate power controller circuitry such as power controller 135 and hardware control circuit 140 of FIG. 1 is not separately shown. Depending upon implementation such components may be separate circuits present within SoC 200 or this functionality may be performed by one or more of first and/or second cores or other processing unit.

Thus with embodiments herein, SoC 200 may be configured to identify, e.g., based on one or more environmental conditions such as power or thermal events, that one or more of first cores 210 and/or second cores 215 may be forced into an idle state. On such identification, control circuitry may, via an interface, inform the OS of such determination. Thereafter various software may be informed, via another interface, of this forced idle state determination of one or more cores, so that appropriate action may be taken.

Embodiments thus encompass hardware, OS, and software/application layers (software) to create an end-to-end solution that allows OS and software to dynamically track and react to power, thermal and scalability events that result in hardware causing cores to be taken into a forced idle state. The forced idle state is defined as a state where usage of the respective core is substantially restricted. In the forced idle state, an OS will park a core and inject idle time on the respective core. If a thread is affinitized to a core in the forced idle state, then the OS will periodically schedule the thread to run for a very brief duration. The duration and frequency of run time in this case will be enough to make forward progress but performance will be extremely limited. The available state is defined as a state where a core is available for software to use without scheduling restrictions.

As an example of the limited nature of forced idle state forward progress, consider the following situation. Assume an application spawns compute intensive software threads equal to the number of cores on the system, and affinitizes one software thread per core. In the forced idle state, where x+y is equal to the total number of software threads, the performance of y threads affinitized to the cores in the forced idle state may be much lower than the performance of the x threads that execute on cores in the available state. In some implementations, which threads are y and which are x may be rotated for optimal performance. Alternatively the cores that are placed into the forced idle state and the cores that are not placed into the forced idle state can be rotated for optimal performance.

Figure 3:
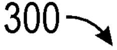
FIG. 3 is a state diagram in accordance with an embodiment.
Figure 3:
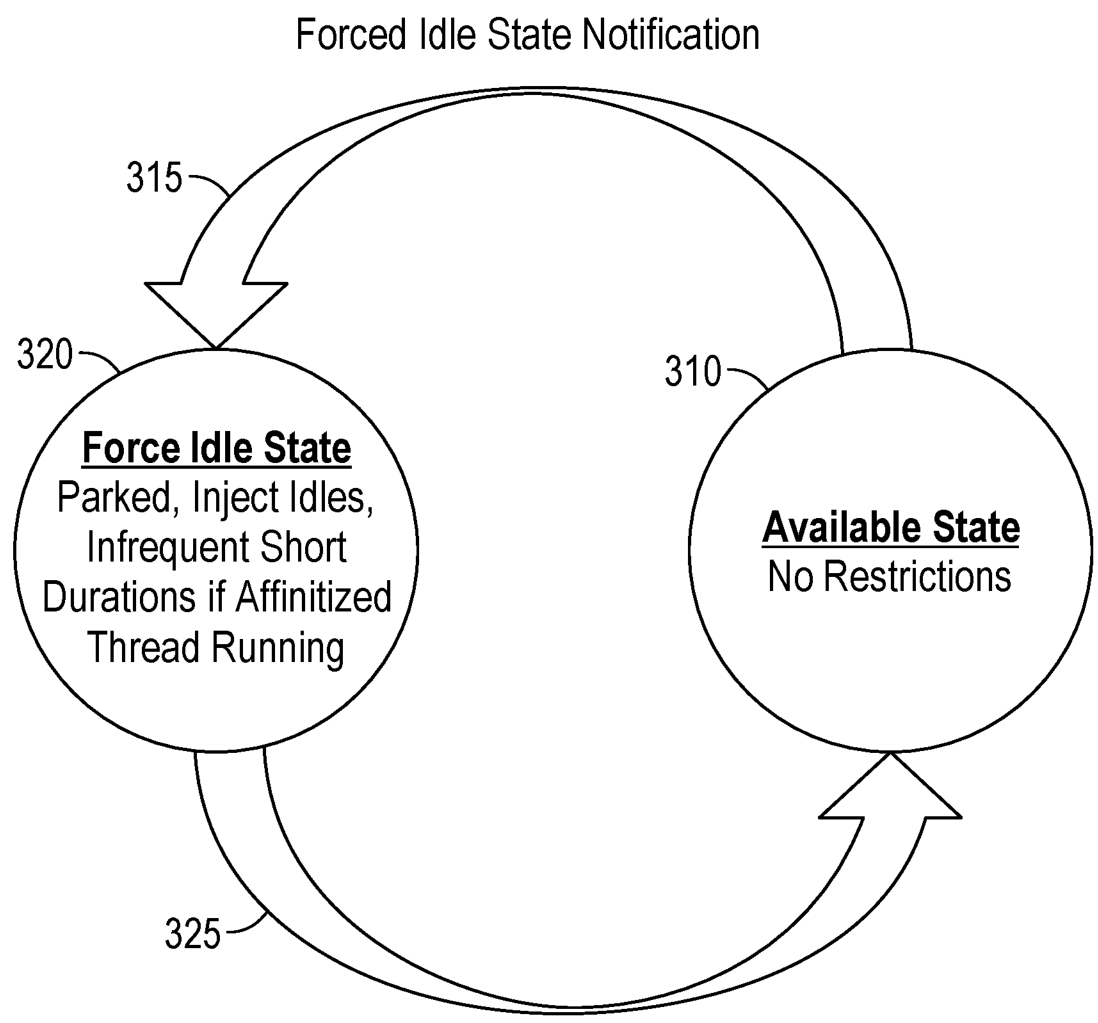

A core can move between the "forced idle" state and "available" state as shown in FIG. 3. More specifically FIG. 3 shows a state diagram of operation of a processor in accordance with an embodiment. As shown in FIG. 3, in state diagram 300 cores may be present in one of two states, namely an available state 310 and a forced idle state 320. In available state 310, cores are under no restriction and a variety of different workloads may be scheduled on such cores by an OS or other scheduling entity. Note that although in available state 310, cores are indicated to be "available" that does not mean that the cores are necessarily actively performing workloads. Available state 310 means that there are no restrictions on execution from a constraint point of view (e.g., power or thermal).

Instead when a given core is in forced idle state 320, there are restrictions on activity of the core. Depending upon implementation, such limitations may include one or more of parking the core, injecting idles into an execution stream or so forth. If an affinitized thread is scheduled to a core in forced idle state 320, the affinitized thread may be allowed to continue to execute. However, such execution is restricted, e.g., by enabling infrequent, short durations of activity that, while allowing the thread to make forward progress, materially and substantially impact thread execution throughput.

As further illustrated in FIG. 3, a notification 315 may issue from a processor hardware circuit to the OS to indicate transition of one or more cores into forced idle state 320. Notification 315 may occur in response to a thermal power and/or a scalability event that is detected. When such constraint(s) are no longer present, another notification 325 may be issued to the OS to indicate that one or more cores present in forced idle state 320 may now transition to available state 310. Understand while shown at this high level in the embodiment of FIG. 3, variations and alternatives are possible. Furthermore, note that while only two states are shown, additional states may be available, such as one or more intermediate forced idle states that provide progressively greater amounts of restriction leading up to a highest forced idle state.

Hardware is responsible for monitoring and detecting power, thermal and scalability events that signal whether any of the cores are to enter a forced idle state change. If hardware determines that a core is to enter or exit the forced idle state, it signals this state change request to the OS.

Figure 4:
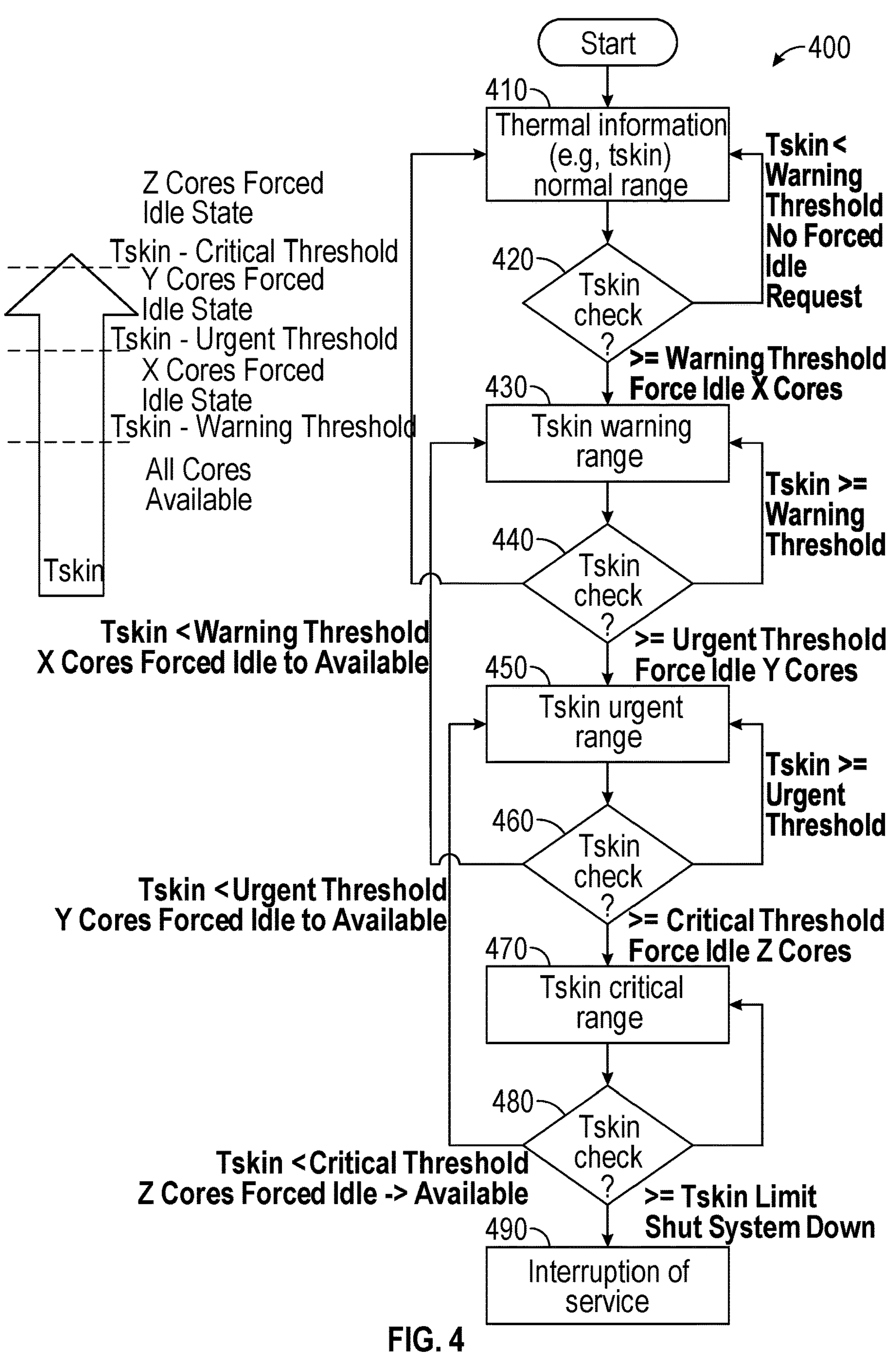
FIG. 4 is a flow diagram of a method in accordance with an embodiment.

Referring now to FIG. 4, shown is a flow diagram of a method in accordance with an embodiment. More specifically, method 400 of FIG. 4 is a method for raising a notification of a forced idle state for one or more cores in response to a thermal event. Method 400 may be performed by hardware circuitry, such as a control circuit of an SoC or other such processor. As such, method 400 may be performed by hardware circuitry alone, and/or in combination with firmware and/or software.

As illustrated, method 400 begins during normal system operation when the processor is operating in a normal thermal range (block 410) (e.g., as measured by one or more temperature sensors). While in the example of FIG. 4, a skin temperature (Tskin) is used as the analysis metric, in other embodiments some other thermal metric may be used. While in this normal operating range, it is determined (at diamond 420) whether the skin temperature is less than a warning threshold which may be set at a first temperature level at which some level of constraint may be effected. Note that this warning threshold may be relatively lower than other thermal thresholds, such as a thermal design power (TDP) level or other known thermal thresholds, such as TM1, TM2 or so forth.

In any event, if it is determined at diamond 420 that the skin temperature exceeds this warning threshold, control passes to block 430 where the processor enters a warning range. In this warning range, one or more cores (X cores) may be placed into a forced idle state. As such, the hardware circuitry sends a forced idle notification to the OS to indicate that X cores are to be placed into the forced idle state. In response to this request, which may be issued via an Intel® Hardware Guidance Scheduling+ (HGS+) interface, the OS in turn may update a core status structure and provide a notification (e.g., by way of interrupt) to various software.

Still with reference to FIG. 4, additional comparisons of skin temperature to additional thresholds, namely an urgent threshold and a critical threshold, occur at diamonds 440 and 460. If it is determined at any of these instances that the skin temperature exceeds the given threshold, the processor may enter into other temperature ranges, namely an urgent range 450 or a critical range 470 in which additional cores may be placed in the forced idle state (e.g., Y cores in urgent range 450 and Z cores in critical range 470).

Still with reference to FIG. 4, if at some later time during operation in critical range 470 (e.g., responsive to a timer timeout) it is determined at diamond 480 that the skin temperature still exceeds the critical threshold, control passes to block 490. At block 490 an interruption of service may occur in which cores may be forced into an idle C-state. In this idle C-state no forward progress is made and the cores become fully inactive such that temperature starts to reduce below one or more of the above-described thresholds. Thus FIG. 4 shows an implementation in which incremental idling of cores occurs until a subset or all cores are idled. If this control is still insufficient to reduce temperature, a system shutdown may occur. Note that while FIG. 4 is based on a Tskin monitor, similar flows can be applied to monitoring scalability or power events and adjust the available cores based on various events.

Figure 5:
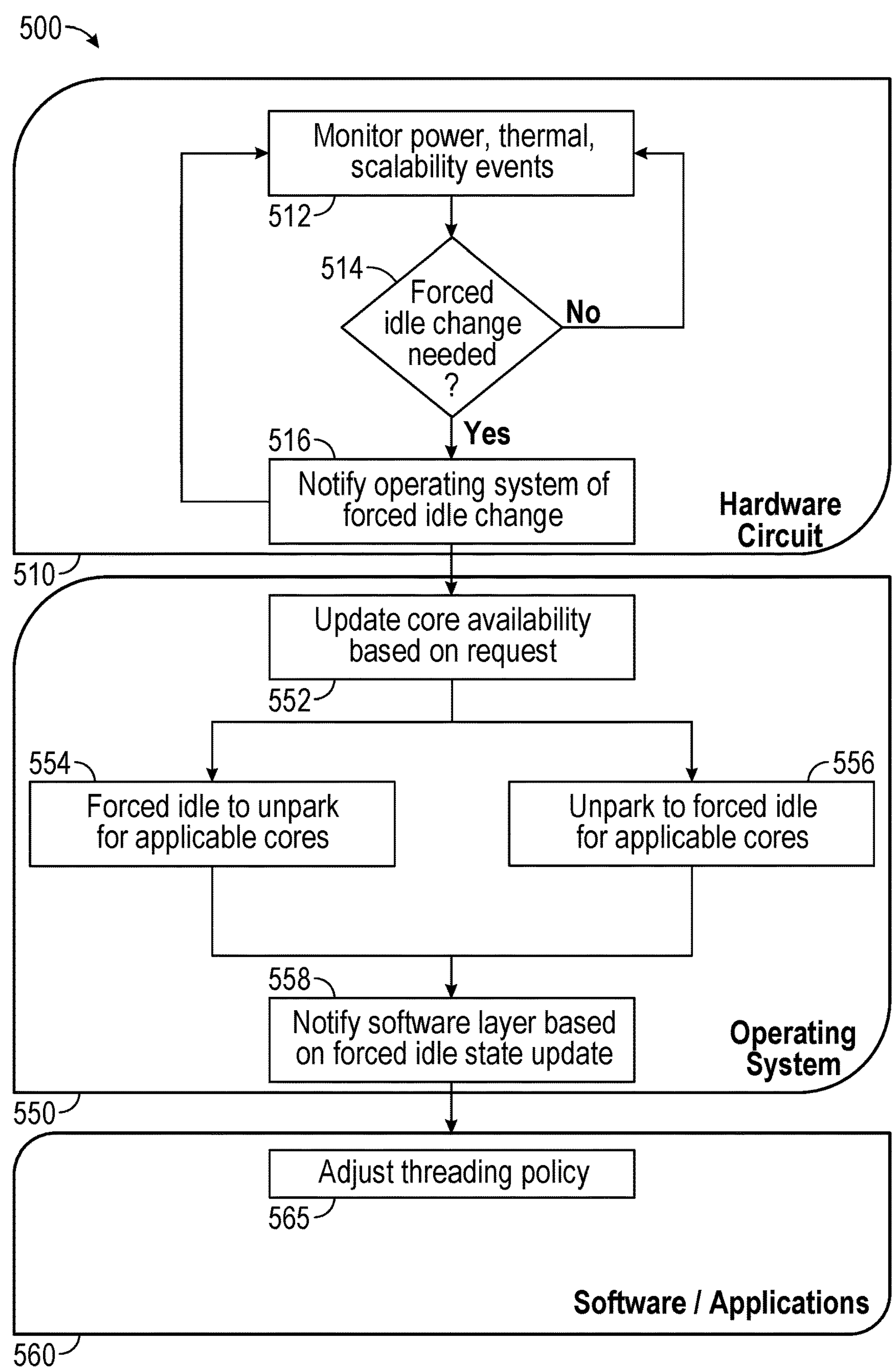
FIG. 5 is a flow diagram of a method in accordance with another embodiment.

Referring now to FIG. 5, shown is a flow diagram of a method in accordance with another embodiment. More specifically, method 500 of FIG. 5 is an overall system method for identifying events that may trigger a forced idle state transition, notifying an OS of the same and in turn, the OS notifying software of the same. Thus in FIG. 5, method 500 may be performed by processor hardware circuitry (at block 510), OS (at block 550), and software/applications (at block 560).

With regard to the hardware circuitry, at block 512 it may during normal operation monitor for power, thermal and/or scalability events. Next at diamond 514 it may be determined, in response to one or more such events, if a forced idle change is needed. If so, at block 516 the hardware circuitry notifies the OS of the forced idle change. In an embodiment, this notification may be by way of an update to an interface between the hardware circuitry and the OS, which in one embodiment may be an Intel® Thread Directory technology (aka HGS+) as which specific core(s) are to be placed into the forced idle state.

Next the OS at block 552 may change core availability based on the hardware request that is received by way of the notification. For example, the request may include an identification of one or more specific cores to be transitioned to the forced idle state. Based on such notification, the OS may update a core status structure accordingly, either at block 554 (moving one or more applicable cores from the forced idle state to the available or unparked state) or at block 556 (moving one or more applicable cores to the forced idle state from the available or unparked state). Finally at block 558, the OS notifies the software layer regarding the forced idle state change. In an embodiment, this notification may be by way of an update to a core status structure and an interrupt or other signal to the software layer. Also, on this change to core status, a scheduler of the OS may no longer schedule non-affinitized workloads to any core in the forced idle state. In some cases, the OS may also migrate pending threads in queues of these forced idle state cores to other cores.

With further reference to FIG. 5, at block 565 software/applications may adjust a threading policy based on this notification. For example, this dynamic notification of update to core availability may cause such software to adjust affinity of threads to particular cores and/or to adjust a thread count of usable cores to which the software may allocate threads.

In one embodiment, the notification to software may be by way of an application programming interface (API) to provide an identification of logical processor IDs of one or more cores to transition into or out of the forced idle state.

Figure 6:
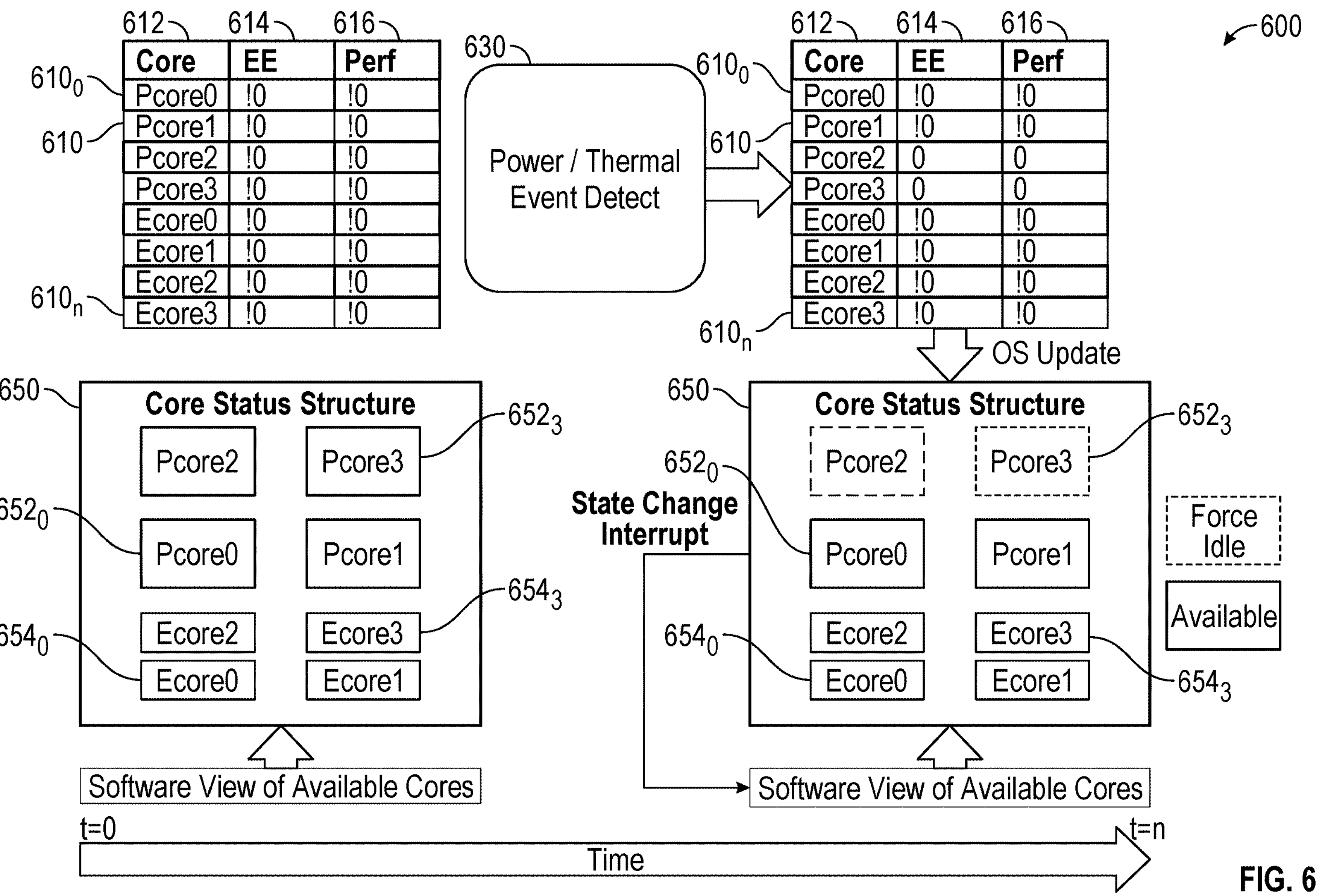
FIG. 6 is an illustration of various interfaces in accordance with an embodiment.

Referring now to FIG. 6, shown is an illustration of the various interfaces in accordance with an embodiment. As shown in FIG. 6, a hardware feedback interface 610 may be a structure that provides forced idle state notifications to an OS from the hardware circuit. More specifically as shown in FIG. 6, interface 610 may be a structure having a plurality of entries 6100-*n*, with each entry associated with a given core. As shown, each entry includes an identification field 612, a performance field 614 and an efficiency field 616. As illustrated on the left side of FIG. 6, in the absence of a constraint, the energy efficiency values and performance values all have non-zero values, indicating that the cores are present in an available state and have a given level of efficiency and performance.

However on detection of a constraint (at block 630), the hardware circuit may update one or more of the fields of one or more core's entries to indicate the forced idle state. Specifically as shown on the right side of FIG. 6, entries associated with P-cores 2 and 3 are updated to a zero value, indicating the forced idle state. Stated another way, a non-zero value in both the performance and energy efficiency fields indicates the performance and efficiency rating relative to other cores and indicates that the core is available. If both fields are marked with zero for a given core, then this is a request for the respective processor to be moved to the forced idle state. Note of course that in other embodiments, hardware feedback interface 610 may include an additional field to indicate when a core is in the forced idle state.

FIG. 6 further illustrates the interface by which the OS may notify software regarding forced idle state transitions. Specifically, a core status structure 650, which may be a data structure stored in memory, provides an identification of cores of the processor. As shown in the implementation of FIG. 6, a first set of identifiers $\mathbf{652}_{0\text{-}3}$ provide an identification of a first type of core (e.g., P-cores) and a second type of core (e.g., E-cores). In an embodiment, identifiers 652, 654 may be logical processor IDs. Note that on the left side of FIG. 6, all cores are in an available state, while after a constraint is identified as shown on the right side of FIG. 6, various cores (P-cores 2 and 3) may be placed into the forced idle state. To provide a dynamic notification to software of such updates, the OS may send an interrupt to software (e.g., to threading libraries), which may use an API to read the core status structure.

Based on the update information, software may adjust threading policies based on the number of cores in the available and forced idle states. Note that software can query this API at any time. When the OS reduces the number of cores available, the OS may time share available resources (e.g., cores) according to an OS quality of service (QoS) policy. In this way, a program or application is not restricted from running, that is, nothing will be completely throttled or stalled.

Figure 7:
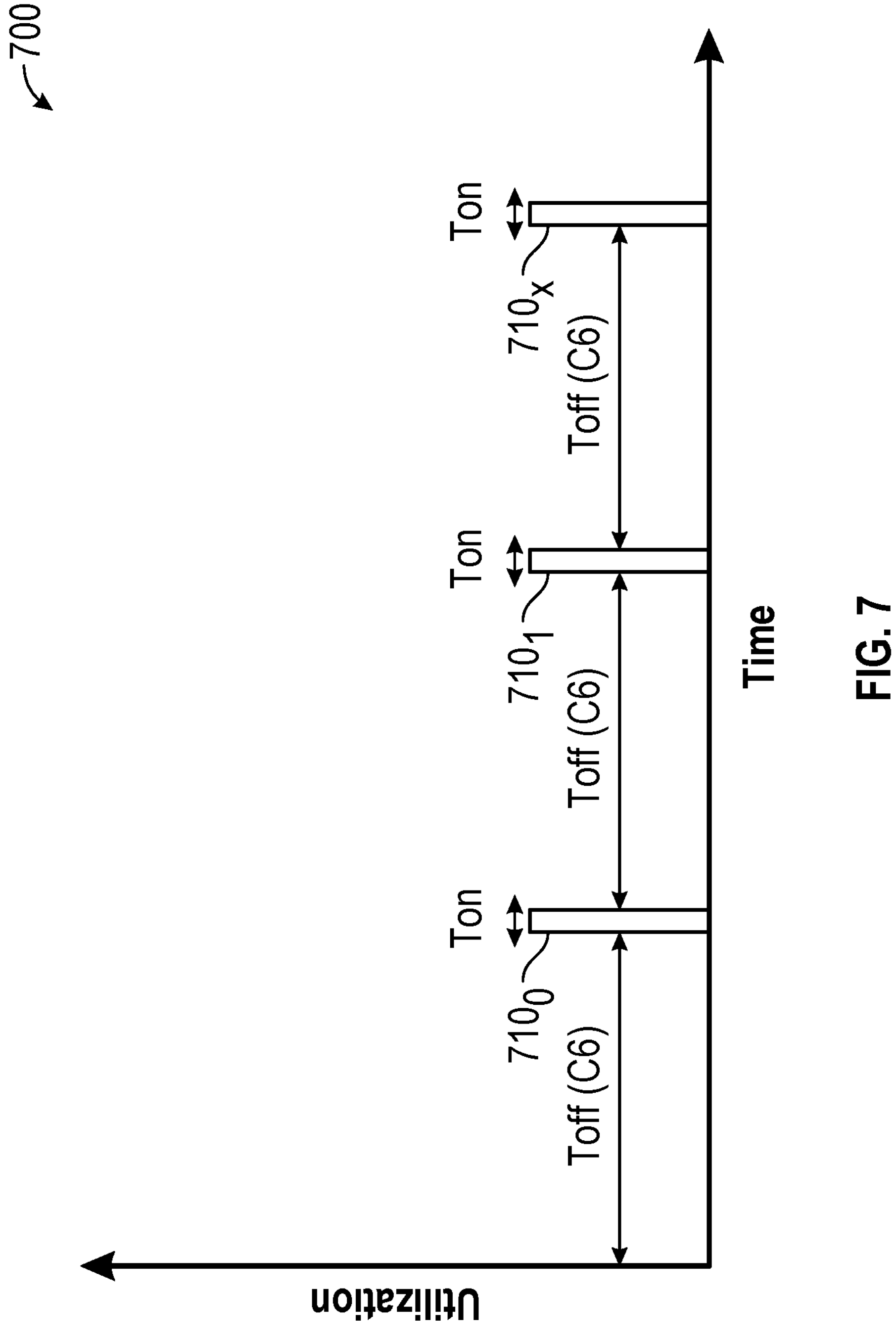
FIG. 7 is a timing diagram of operation in accordance with an embodiment.

Referring now to FIG. 7, shown is a timing diagram illustrating affinitized thread scheduling in accordance with an embodiment. As shown in timing diagram 700, an OS scheduler may schedule an affinitized thread to a core in the forced idle state. More specifically, a plurality of on periods $\mathbf{710}_{0\text{-}x}$ occur in which the core may execute this affinitized thread such that forward progress is made and functional correctness result, but very low performance is experienced if the thread continues running on a core in the force idle state. In one example, a duty cycle of these on times may be limited to be less than approximately 20%. In an embodiment, between these active states during on periods 710, a power controller or the control circuitry may cause the core to be placed into a low power state, e.g., a given C-state (such as the C6 shown in FIG. 7). This on period may have negligible impact on power thermals but allows affinity to not be functionally disrupted and minimal forward progress to be made.

With embodiments, software can dynamically scale a number of threads based on scalability information from hardware. In a particular example of Intel® Thread Director or HSG+, there may be multiple classes available, including a non-scalable work class (spins on pauses). More generally, non-scalability may arise when software does not have enough work, such that an overhead of adding a thread is larger than a benefit from adding the thread. If non-scalable work (time spent in this class) is very high, then a hardware control circuit can decide to park certain cores. However just parking cores but not communicating such information to software does not help improve scalability. As one example of a scalability constraint, a core parking engine can determine time in non-scalable work (e.g., a non-scalable work class) and based at least in part thereon, trigger forced idle core states and notifications as described herein.

Instead with embodiments providing notification to software and software adjusting thread count, scalability increases. For example, consider a 28 core processor indicating only 16 cores available by parking (parking 12 cores) as compared to booting (e.g., via basic input output system (BIOS)) only 16 cores. For non-scalable workloads, just parking cores does not help since software layers (e.g., threading libraries) still query a total core count and number of threads, which returns the total cores available (without an embodiment). By signaling software layers so that they can reduce the number of threads rather than just parking cores, scalability improves.

Figure 8:
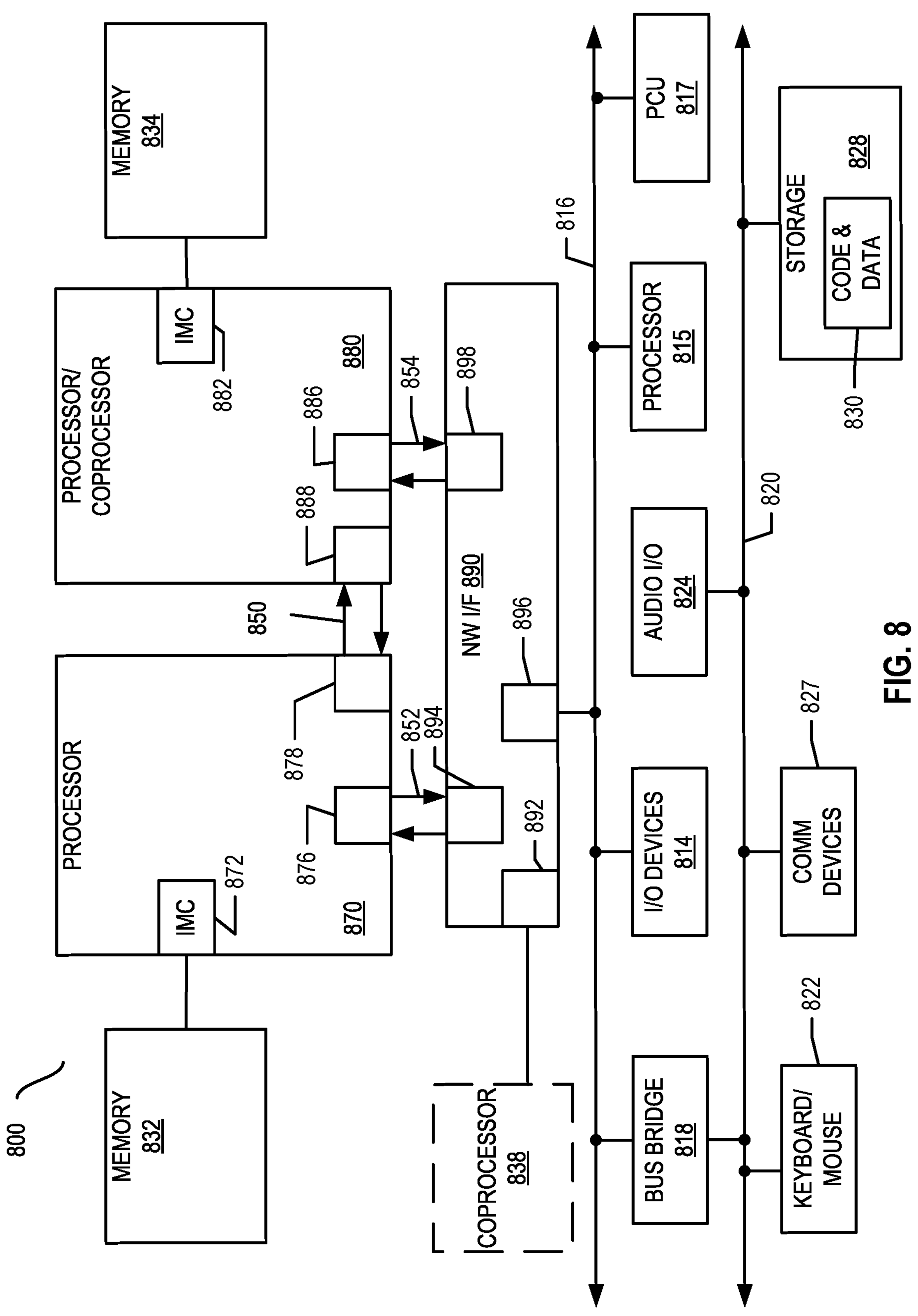
FIG. 8 illustrates an example computing system.

FIG. 8 illustrates an example computing system. Multiprocessor system 800 is an interfaced system and includes a plurality of processors or cores including a first processor 870 and a second processor 880 coupled via an interface 850 such as a point-to-point (P-P) interconnect, a fabric, and/or bus. In some examples, the first processor 870 and the second processor 880 are homogeneous. In some examples, first processor 870 and the second processor 880 are heterogenous. Though the example system 800 is shown to have two processors, the system may have three or more processors, or may be a single processor system. In some examples, the computing system is a SoC.

Processors 870 and 880 are shown including integrated memory controller (IMC) circuitry 872 and 882, respectively. Processor 870 also includes interface circuits 876 and 878; similarly, second processor 880 includes interface circuits 886 and 888. Processors 870, 880 may exchange information via the interface 850 using interface circuits 878, 888. IMCs 872 and 882 couple the processors 870, 880 to respective memories, namely a memory 832 and a memory 834, which may be portions of main memory locally attached to the respective processors. Processors 870, 880 also may provide a hardware interface to communicate forced idle state information regarding their cores to an OS as described herein.

Processors 870, 880 may each exchange information with a network interface (NW I/F) 890 via individual interfaces 852, 854 using interface circuits 876, 894, 886, 898. The network interface 890 (e.g., one or more of an interconnect, bus, and/or fabric, and in some examples is a chipset) may optionally exchange information with a coprocessor 838 via an interface circuit 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via an interface such as P-P interconnect, such that either or both processors' local cache information may be stored in the shared cache if a processor is placed into a low power mode.

Network interface 890 may be coupled to a first interface 816 via interface circuit 896. In some examples, first interface 816 may be an interface such as a Peripheral Component Interconnect (PCI) interconnect, a PCI Express interconnect or another I/O interconnect. In some examples, first interface 816 is coupled to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interface 816, along with a bus bridge 818 which couples first interface 816 to a second interface 820. In some examples, one or more additional processor(s) 815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 816. In some examples, second interface 820 may be a low pin count (LPC) interface. Various devices may be coupled to second interface 820 including, for example, a keyboard and/or mouse 822, communication devices 827 and storage circuitry 828. Storage circuitry 828 may be one or more non-transitory machine-readable storage media as described below, such as a disk drive or other mass storage device which may include instructions/code and data 830. Further, an audio I/O 824 may be coupled to second interface 820. Note that other architectures than the point-to-point architecture described above are possible. For example, instead of the point-to-point architecture, a system such as multiprocessor system 800 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 9:
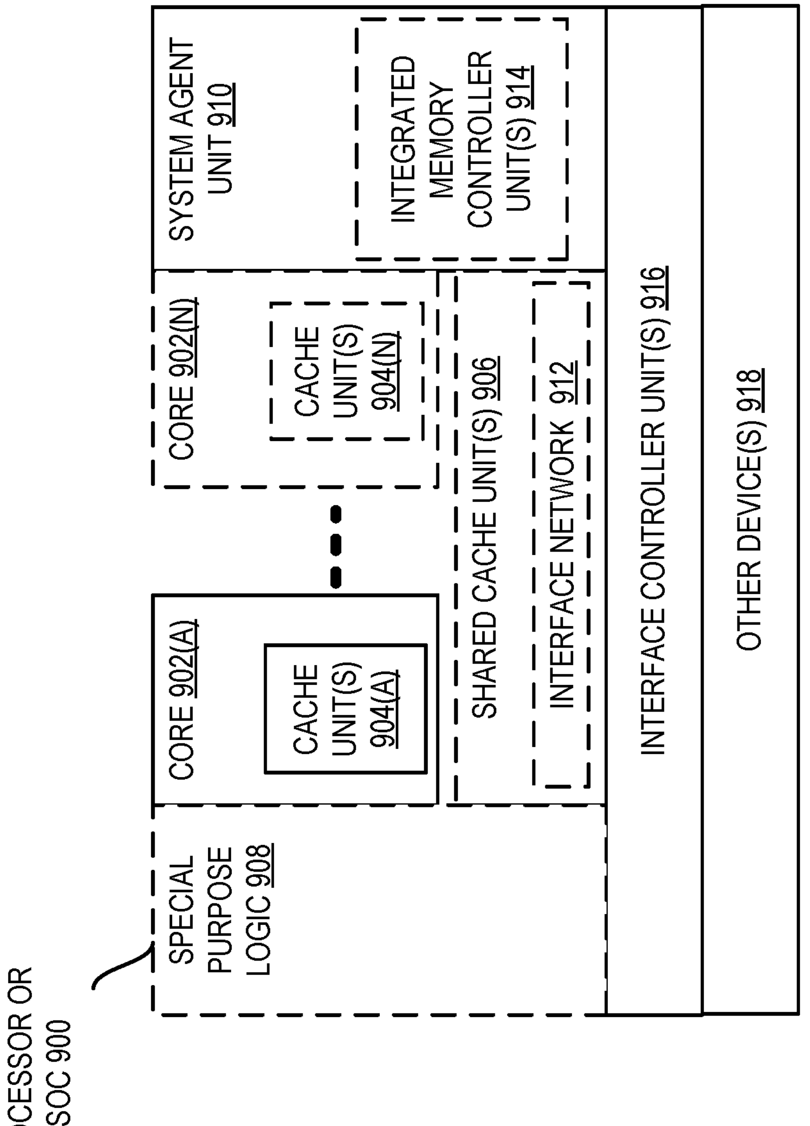
FIG. 9 illustrates a block diagram of an example processor and/or System on a Chip (SoC) that may have one or more cores and an integrated memory controller.

FIG. 9 illustrates a block diagram of an example processor and/or SoC 900 that may have one or more cores and an integrated memory controller. The solid lined boxes illustrate a processor 900 with a single core 902(A), system agent unit circuitry 910, and a set of one or more interface controller unit(s) circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interface controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904(A)-(N) within the cores 902(A)-(N), a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples interface network circuitry 912 (e.g., a ring interconnect) interfaces the special purpose logic 908 (e.g., integrated graphics logic), the set of shared cache unit(s) circuitry 906, and the system agent unit circuitry 910, alternative examples use any number of well-known techniques for interfacing such units. In some examples, coherency is maintained between one or more of the shared cache unit(s) circuitry 906 and cores 902(A)-(N). In some examples, interface controller units circuitry 916 couple the cores 902 to one or more other devices 918 such as one or more I/O devices, storage, one or more communication devices (e.g., wireless networking, wired networking, etc.), etc.

In some examples, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous in terms of instruction set architecture (ISA). Alternatively, the cores 902(A)-(N) may be heterogeneous in terms of ISA; that is, a subset of the cores 902(A)-(N) may be capable of executing an ISA, while other cores may be capable of executing only a subset of that ISA or another ISA.

Example Core Architectures—in-Order and Out-of-Order Core Block Diagram.

Figure 10A:
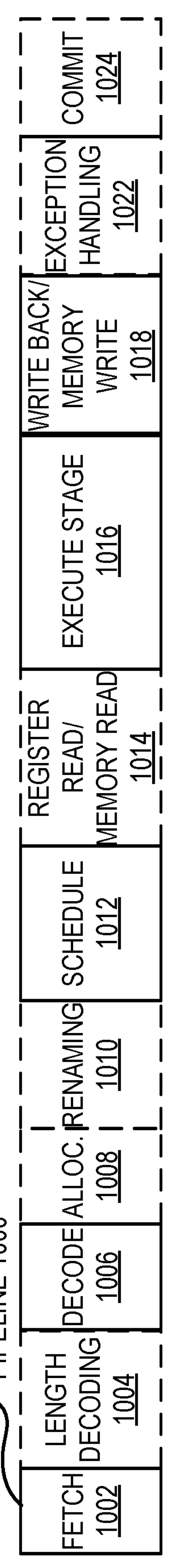
FIG. 10(A) is a block diagram illustrating both an example in-order pipeline and an example register renaming, out-of-order issue/execution pipeline according to examples.
Figure 10B:
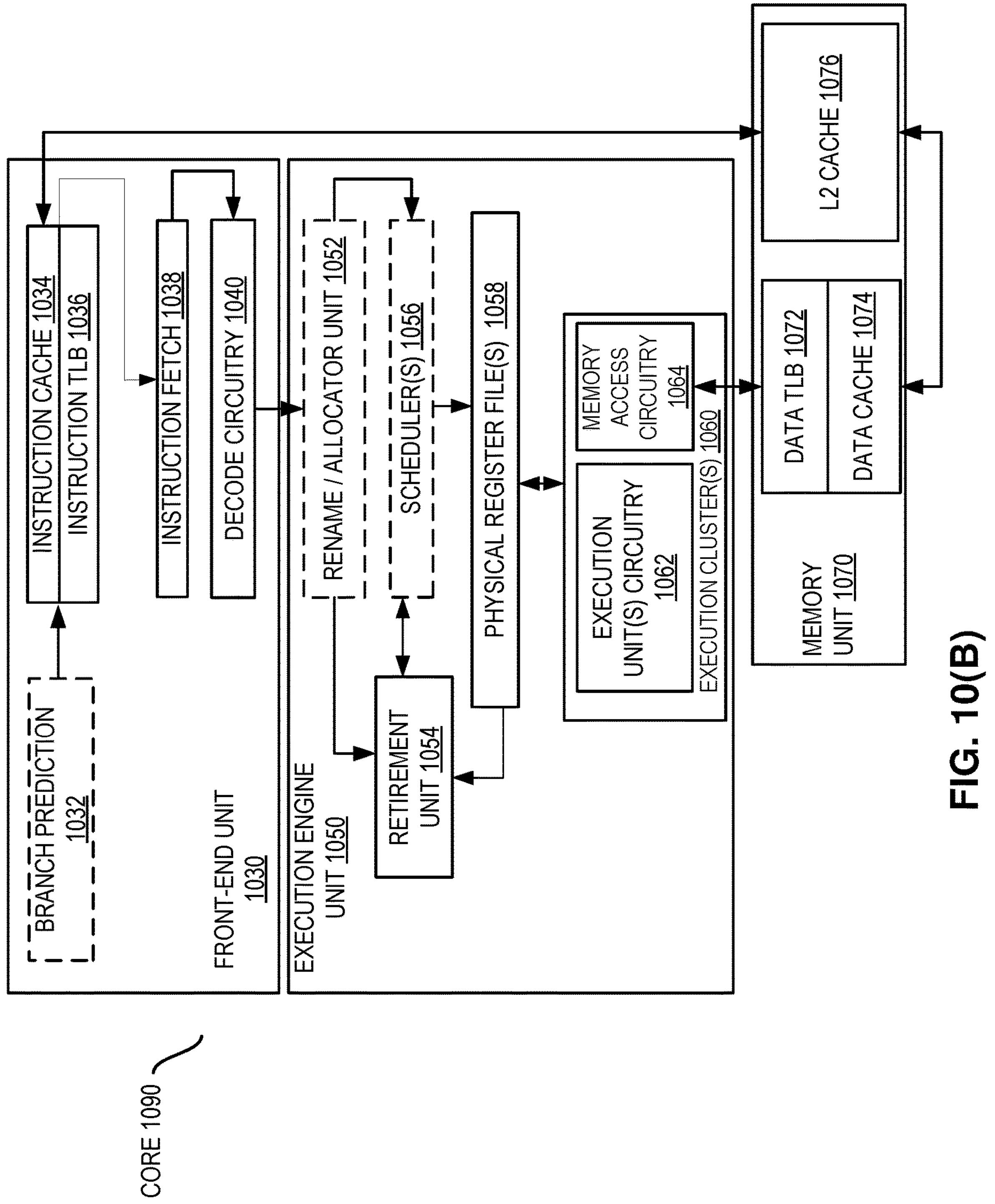
FIG. 10(B) is a block diagram illustrating both an example in-order architecture core and an example register renaming, out-of-order issue/execution architecture core to be included in a processor according to examples.

FIG. 10(A) is a block diagram illustrating both an example in-order pipeline and an example register renaming, out-of-order issue/execution pipeline according to examples. FIG. 10(B) is a block diagram illustrating both an example in-order architecture core and an example register renaming, out-of-order issue/execution architecture core to be included in a processor according to examples. The solid lined boxes in FIGS. 10(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10(A), a processor pipeline 1000 includes a fetch stage 1002, an optional length decoding stage 1004, a decode stage 1006, an optional allocation (Alloc) stage 1008, an optional renaming stage 1010, a schedule (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, and during the decode stage 1006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1006 and the register read/memory read stage 1014 may be combined into one pipeline stage. In one example, during the execute stage 1016, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 10(B) may implement the pipeline 1000 as follows: 1) the instruction fetch circuitry 1038 performs the fetch and length decoding stages 1002 and 1004; 2) the decode circuitry 1040 performs the decode stage 1006; 3) the rename/allocator unit circuitry 1052 performs the allocation stage 1008 and renaming stage 1010; 4) the scheduler(s) circuitry 1056 performs the schedule stage 1012; 5) the physical register file(s) circuitry 1058 and the memory unit circuitry 1070 perform the register read/memory read stage 1014; the execution cluster(s) 1060 perform the execute stage 1016; 6) the memory unit circuitry 1070 and the physical register file(s) circuitry 1058 perform the write back/memory write stage 1018; 7) various circuitry may be involved in the exception handling stage 1022; and 8) the retirement unit circuitry 1054 and the physical register file(s) circuitry 1058 perform the commit stage 1024.

FIG. 10(B) shows a processor core 1090 including front-end unit circuitry 1030 coupled to execution engine unit circuitry 1050, and both are coupled to memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front-end unit circuitry 1030 may include branch prediction circuitry 1032 coupled to instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1040 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front-end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, address generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to data cache circuitry 1074 coupled to level 2 (L2) cache circuitry 1076. In one example, the memory access circuitry 1064 may include load unit circuitry, store address unit circuitry, and store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, level 3 (L3) cache circuitry (not shown), and/or main memory. The L2 cache circuitry 1076 is coupled to one or more other levels of cache and eventually to a main memory.

The core 1090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1090 includes logic to support a packed data instruction set architecture extension (e.g., AVX1, AVX2), thereby allowing the operations used by many multimedia applications to be performed using packed data. In addition the core 1090 may include DFX circuitry, including a TAP controller having a JTAG interface, at least portions of which may be gated by a replica TAP circuit as described herein.

Example Execution Unit(s) Circuitry.

Figure 11:
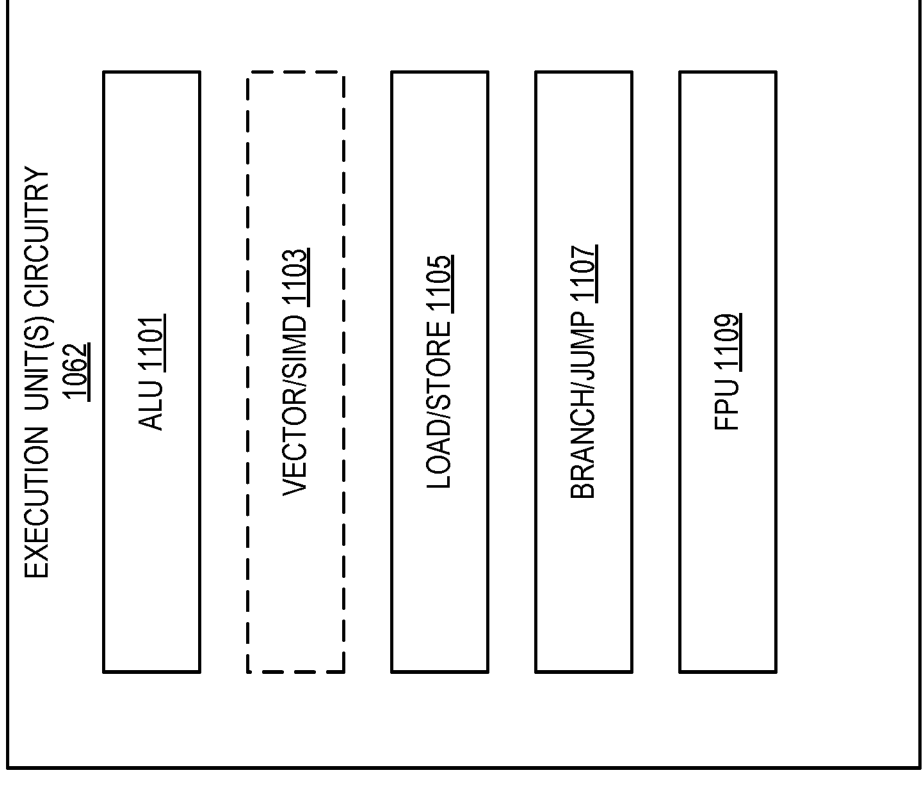
FIG. 11 illustrates examples of execution unit(s) circuitry.

FIG. 11 illustrates examples of execution unit(s) circuitry, such as execution unit(s) circuitry 1062 of FIG. 10(B). As illustrated, execution unit(s) circuitry 1062 may include one or more ALU circuits 1101, optional vector/single instruction multiple data (SIMD) circuits 1103, load/store circuits 1105, branch/jump circuits 1107, and/or Floating-point unit (FPU) circuits 1109. ALU circuits 1101 perform integer arithmetic and/or Boolean operations. Vector/SIMD circuits 1103 perform vector/SIMD operations on packed data (such as SIMD/vector registers). Load/store circuits 1105 execute load and store instructions to load data from memory into registers or store from registers to memory. Load/store circuits 1105 may also generate addresses. Branch/jump circuits 1107 cause a branch or jump to a memory address depending on the instruction. FPU circuits 1109 perform floating-point arithmetic. The width of the execution unit(s) circuitry 1062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 12:
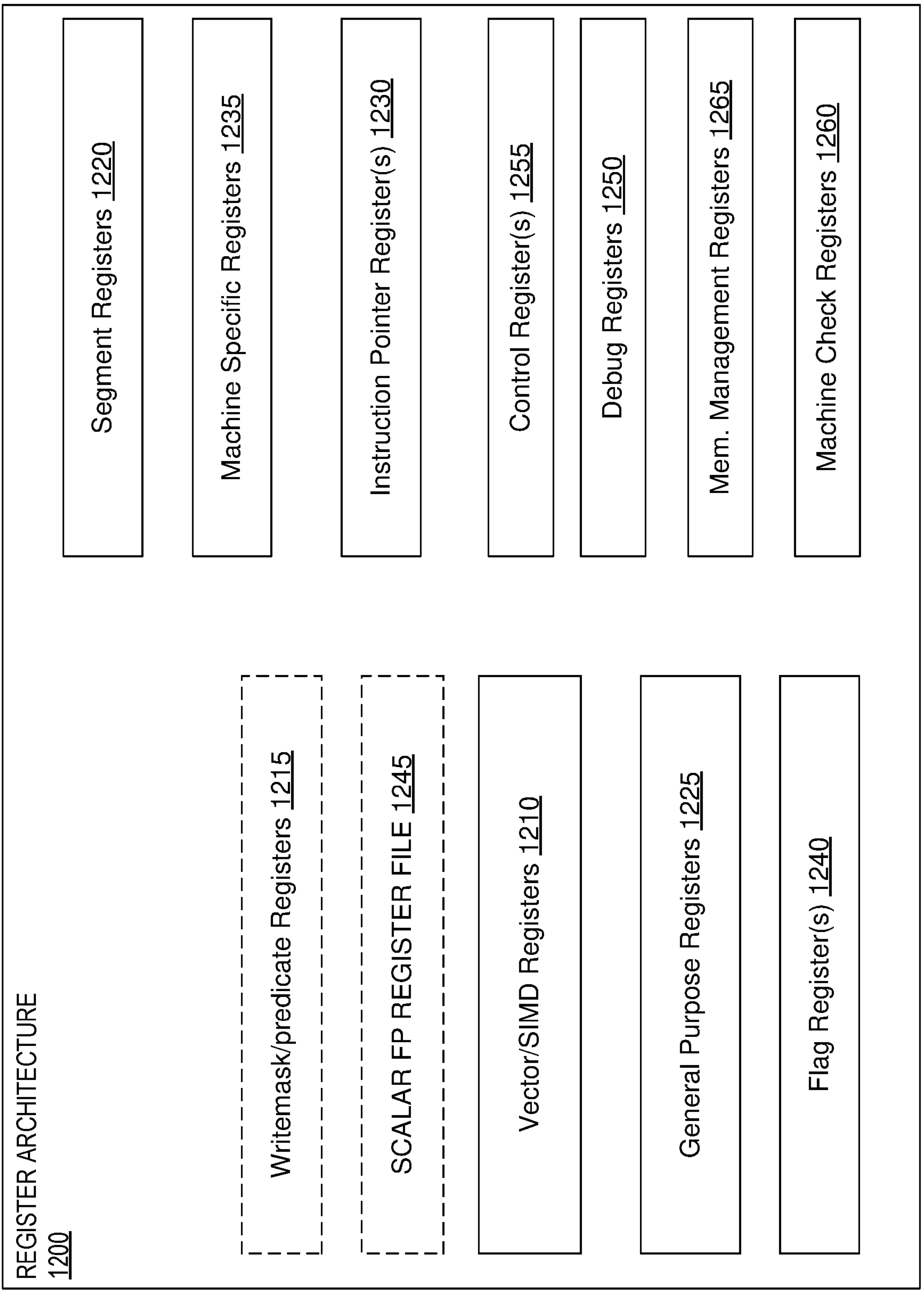
FIG. 12 is a block diagram of a register architecture according to some examples.

FIG. 12 is a block diagram of a register architecture 1200 according to some examples. As illustrated, the register architecture 1200 includes vector/SIMD registers 1210 that vary from 128-bit to 1,024 bits width. In some examples, the vector/SIMD registers 1210 are physically 512-bits and, depending upon the mapping, only some of the lower bits are used. For example, in some examples, the vector/SIMD registers 1210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1200 includes writemask/predicate registers 1215. For example, in some examples, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1215 corresponds to a data element position of the destination. In other examples, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1200 includes scalar floating-point (FP) register file 1245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some examples, the one or more flag registers 1240 are called program status and control registers.

Segment registers 1220 contain segment points for use in accessing memory. In some examples, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory (mem) management registers 1265 specify the locations of data structures used in protected mode memory management. These registers may include a global descriptor table register (GDTR), interrupt descriptor table register (IDTR), task register, and a local descriptor table register (LDTR) register.

Figure 13:
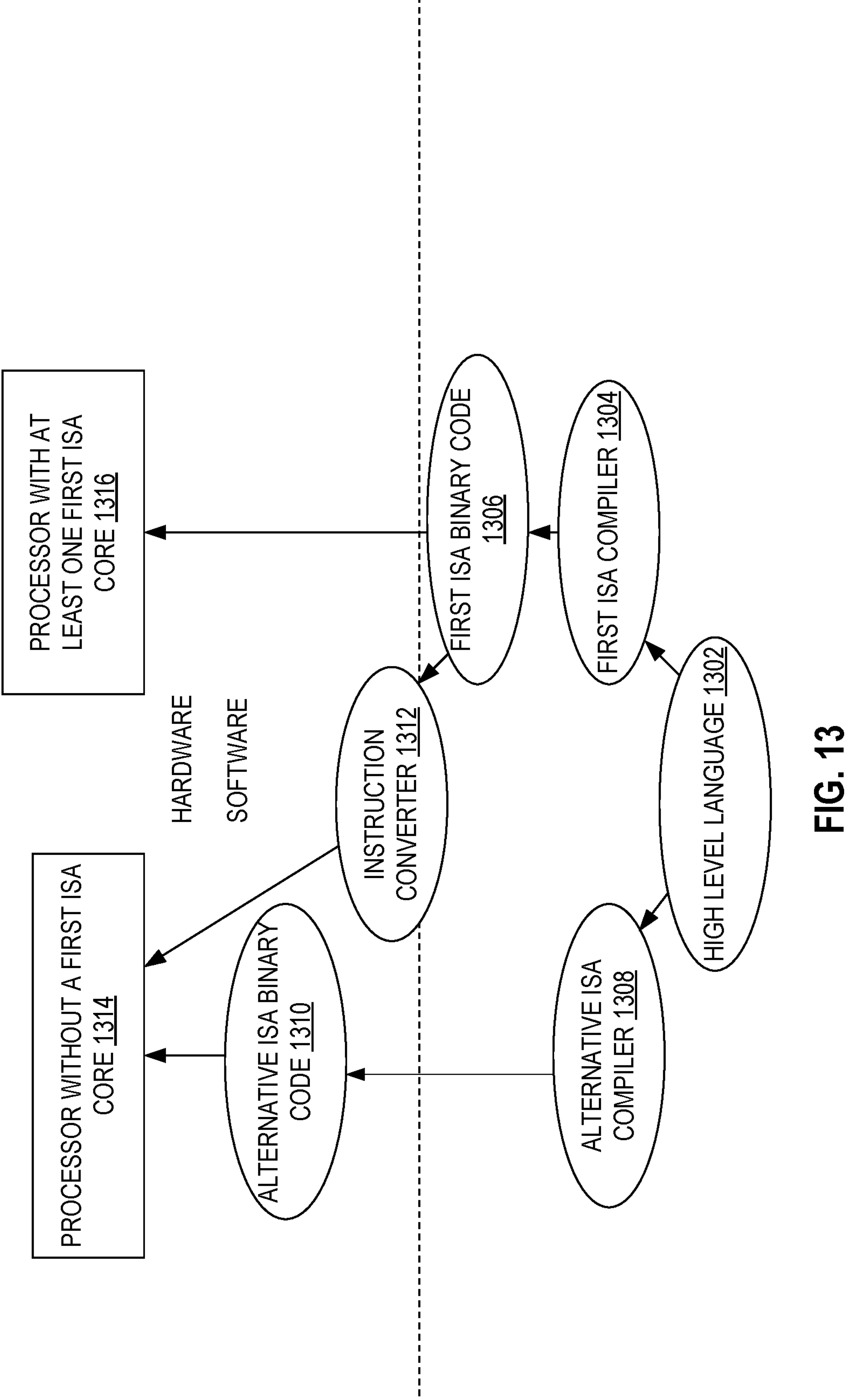
FIG. 13 is a block diagram illustrating the use of a software instruction converter to convert binary instructions in a source instruction set architecture to binary instructions in a target instruction set architecture according to examples.

FIG. 13 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 13 shows a program in a high-level language 1302 may be compiled using a first ISA compiler 1304 to generate first ISA binary code 1306 that may be natively executed by a processor with at least one first ISA core 1316. The processor with at least one first ISA core 1316 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 1304 represents a compiler that is operable to generate first ISA binary code 1306 (e.g., object code) that can, with or without additional linkage processing, be executed on the processor with at least one first ISA core 1316. Similarly, FIG. 13 shows the program in the high-level language 1302 may be compiled using an alternative ISA compiler 1308 to generate alternative ISA binary code 1310 that may be natively executed by a processor without a first ISA core 1314. The instruction converter 1312 is used to convert the first ISA binary code 1306 into code that may be natively executed by the processor without a first ISA core 1314. This converted code is not necessarily to be the same as the alternative ISA binary code 1310; however, the converted code will accomplish the general operation and be made up of instructions from the alternative ISA. Thus, the instruction converter 1312 represents software, firmware, hardware, or a combination thereof that, through emulation, simulation or any other process, allows a processor or other electronic device that does not have a first ISA processor or core to execute the first ISA binary code 1306.

The following examples pertain to further embodiments.

In one example, a processor comprises: a plurality of cores to execute instructions; at least one monitor coupled to the plurality of cores to measure at least one of power information, temperature information, or scalability information; and a control circuit coupled to the at least one monitor, where based at least in part on the at least one of the power information, the temperature information, or the scalability information, the control circuit is to notify an OS that one or more of the plurality of cores are to transition to a forced idle state in which non-affinitized workloads are prevented from being scheduled to the one or more cores.

In an example, the processor further comprises a hardware feedback interface via which the control circuit is to communicate with the OS.

In an example, the hardware feedback interface comprises memory to store a structure having a plurality of entries, where each entry is associated with one of the plurality of cores and to identify whether the core is in the forced idle state.

In an example, each entry of the structure further comprises an efficiency field to store efficiency information and a performance field to store performance information.

In an example, the control circuit is to cause the efficiency field and the performance field to be set to a first value to indicate that the associated core is in the forced idle state.

In an example, each entry of the structure further comprises a field to store an indicator to indicate whether the associated core is in the forced idle state.

In an example, a first core of the plurality of cores, when in the forced idle state, is to execute an affinitized thread in a non-performant manner, the first core of a first core type, the plurality of cores further comprising at least one core of a second core type.

In an example, the first core is prevented from execution of a non-affinitized thread when in the forced idle state.

In an example: when the temperature information exceeds a first threshold, the control circuit is to notify the OS that at least one of the plurality of cores is to transition to the forced idle state; and when the temperature information exceeds a second threshold greater than the first threshold, the control circuit is to notify the OS that at least two of the plurality of cores are to transition to the forced idle state.

In an example, when the temperature information falls below the second threshold, the control circuit is to notify the OS that at least one of the at least two of the plurality of cores are to transition to an available state.

In an example, in response to the notification to the OS, the OS is to notify software regarding the transition of the one or more cores to the forced idle state.

In another example, a method comprises: receiving, via an interface, an indication that one or more cores of a processor are to transition to a forced idle state in which non-affinitized workloads are prevented from being scheduled to the one or more cores; updating a core status structure to identify the one or more cores to be in the forced idle state; and notifying at least one application regarding the updating of the core status structure.

In an example, the method further comprises scheduling, with reduced activity, an affinitized workload to a first core of the one or more cores in the forced idle state.

In an example, scheduling, with the reduced activity, the affinitized workload to the first core comprises: scheduling the affinitized workload to have an active duty cycle of less than approximately 20%; and scheduling the affinitized workload to have an inactive duty cycle of greater than approximately 80%, where during the inactive duty cycle the first core is in a low power state.

In an example, the method further comprises migrating an affinitized workload from a first core in the forced idle state to a second core in an available state, the affinitized workload affinitized to the first core and the second core.

In an example, notifying the at least one application regarding the updating of the core status structure comprises notifying a threading library, where the at least one application is to be notified regarding the updating of the core status structure via an API call to the threading library.

In an example, the method further comprises after notifying the at least one application regarding the updating of the core status structure, receiving a notification from the at least one application having a reduced number of software threads.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises: an SoC and a system memory coupled to the SoC. The SoC may include: a first plurality of cores to execute instructions; a second plurality of cores to execute instructions; a power controller to control delivery of an operating voltage and an operating frequency to the first plurality of cores and the second plurality of cores; a control circuit coupled to the first plurality of cores and the second plurality of cores, the control circuit, in response to a constraint in the SoC, to communicate to an OS an identification of transition of one or more of at least one of the first plurality of cores or the second plurality of cores to a forced idle state. The system memory may store a hardware feedback interface, the hardware feedback interface comprising efficiency information and performance information of the first plurality of cores and the second plurality of cores, the hardware feedback interface to further indicate a state of the first plurality of cores and the second plurality of cores.

In an example, the state comprises identification of the forced idle state and an available state, where in the forced idle state non-affinitized workloads are prevented from operation, and in the available state unrestricted operation is allowed.

In an example, the OS is to notify a software layer regarding the transition of the one or more of the at least one of the first plurality of cores or the second plurality of cores to the forced idle state.

In yet a further example, an apparatus comprises: means for receiving an indication that one or more core means are to transition to a forced idle state in which non-affinitized workloads are prevented from being scheduled to the one or more core means; means for updating a core status storage means for identifying the one or more core means to be in the forced idle state; and means for notifying at least one application regarding the updating of the core status structure means.

In an example, the apparatus further comprises means for scheduling, with reduced activity, an affinitized task to a first core means of the one or more core means in the forced idle state.

In an example, the means for scheduling comprises: means for scheduling the affinitized thread to have an active duty cycle of less than approximately 20%; and means for scheduling the affinitized thread to have an inactive duty cycle of greater than approximately 80%, where during the inactive duty cycle the first core means is in a low power state.

In an example, the apparatus further comprises means for migrating an affinitized task from a first core means in the forced idle state to a second core means in an available state, the affinitized task affinitized to the first core means and the second core means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A processor comprising:

a plurality of cores to execute instructions;

at least one monitor coupled to the plurality of cores to measure at least one of power information, temperature information, or scalability information; and a control circuit coupled to the at least one monitor, wherein based at least in part on the at least one of the power information, the temperature information, or the scalability information, the control circuit is to notify an operating system (OS) that one or more of the plurality of cores are to transition to a forced idle state in which non-affinitized workloads are prevented from being scheduled to the one or more cores, wherein a first core of the plurality of cores, when in the forced idle state, is to execute an affinitized thread in a non-performant manner.

2. The processor of claim 1, further comprising a hardware feedback interface via which the control circuit is to communicate with the OS.

3. The processor of claim 2, wherein the hardware feedback interface comprises memory to store a structure having a plurality of entries, wherein each entry is associated with one of the plurality of cores and to identify whether the core is in the forced idle state.

4. The processor of claim 3, wherein each entry of the structure further comprises an efficiency field to store efficiency information and a performance field to store performance information.

5. The processor of claim 4, wherein the control circuit is to cause the efficiency field and the performance field to be set to a first value to indicate that the associated core is in the forced idle state.

6. The processor of claim 4, wherein each entry of the structure further comprises a field to store an indicator to indicate whether the associated core is in the forced idle state.

7. The processor of claim 1, wherein the first core is of a first core type, the plurality of cores further comprising at least one core of a second core type.

8. The processor of claim 7, wherein the first core is prevented from execution of a non-affinitized thread when in the forced idle state.

9. The processor of claim 1, wherein:

when the temperature information exceeds a first threshold, the control circuit is to notify the OS that at least one of the plurality of cores is to transition to the forced idle state; and when the temperature information exceeds a second threshold greater than the first threshold, the control circuit is to notify the OS that at least two of the plurality of cores are to transition to the forced idle state.

10. The processor of claim 9, wherein when the temperature information falls below the second threshold, the control circuit is to notify the OS that at least one of the at least two of the plurality of cores are to transition to an available state.

11. The processor of claim 1, wherein in response to the notification to the OS, the OS is to notify software regarding the transition of the one or more cores to the forced idle state.

12. At least one computer readable medium comprising instructions, which when executed by a processor, cause the processor to execute a method comprising:

receiving, via an interface, an indication that one or more cores of a processor are to transition to a forced idle state in which non-affinitized workloads are prevented from being scheduled to the one or more cores, wherein a first core of the one or more cores, when in the forced idle state, is to execute an affinitized workload in a non-performant manner;

updating a core status structure to identify the one or more cores to be in the forced idle state; and notifying at least one application regarding the updating of the core status structure.

13. The at least one computer readable medium of claim 12, wherein the method further comprises scheduling, with reduced activity, the affinitized workload to the first core of the one or more cores in the forced idle state.

14. The at least one computer readable medium of claim 13, wherein scheduling, with the reduced activity, the affinitized workload to the first core comprises:

scheduling the affinitized workload to have an active duty cycle of less than approximately 20%; and scheduling the affinitized workload to have an inactive duty cycle of greater than approximately 80%, wherein during the inactive duty cycle the first core is in a low power state.

15. The at least one computer readable medium of claim 12, wherein the method further comprises migrating the affinitized workload from the first core in the forced idle state to a second core in an available state, the affinitized workload affinitized to the first core and the second core.

16. The at least one computer readable medium of claim 12, wherein notifying the at least one application regarding the updating of the core status structure comprises notifying a threading library, wherein the at least one application is to be notified regarding the updating of the core status structure via an application programming interface (API) call to the threading library.

17. The at least one computer readable medium of claim 12, wherein the method further comprises after notifying the at least one application regarding the updating of the core status structure, receiving a notification from the at least one application having a reduced number of software threads.

18. A system comprising:

a system on chip (SoC) comprising:

a first plurality of cores to execute instructions;

a second plurality of cores to execute instructions;

a power controller to control delivery of an operating voltage and an operating frequency to the first plurality of cores and the second plurality of cores;

a control circuit coupled to the first plurality of cores and the second plurality of cores, the control circuit, in response to a constraint in the SoC, to communicate to an operating system (OS) an identification of transition of one or more of at least one of the first plurality of cores or the second plurality of cores to a forced idle state, wherein a first core of at least one of the first plurality of cores or the second plurality of cores, when in the forced idle state, is to execute an affinitized thread in a non-performant manner;

a system memory coupled to the SoC, the system memory to store a hardware feedback interface, the hardware feedback interface comprising efficiency information and performance information of the first plurality of cores and the second plurality of cores, the hardware feedback interface to further indicate a state of the first plurality of cores and the second plurality of cores.

19. The system of claim 18, wherein the state indicated by the hardware feedback interface comprises identification of the forced idle state and an available state, wherein, in the forced idle state, non-affinitized workloads are prevented from operation, and, in the available state, unrestricted operation is allowed.

20. The system of claim 18, wherein the OS is to notify a software layer regarding the transition of the one or more of the at least one of the first plurality of cores or the second plurality of cores to the forced idle state.

* * * * *